United States Patent Office 3,356,473
Patented Dec. 5, 1967

3,356,473
METAL-BONDED DIAMOND ABRASIVE BODY
Edwin H. Hull and Thomas A. Vanderslice, Scotia, N.Y., assignors to General Electric Company, a corporation of New York
No Drawing. Filed May 28, 1964, Ser. No. 371,103
2 Claims. (Cl. 51—309)

This invention relates to the establishment of an improved mechanism for the retention of diamond particles relative to each other in diamond compacts or in damond tools and more particularly to the selection of particular coating metals for bonding to the surface of diamond material and to the selection of specific combinations of metal coatings and braze compositions to be employed therewith whereby the integrity of a successful metal-to-diamond bond between a thin film of the coating metal and the diamond surface is maintained during and after the brazing operation.

A diamond compact is a cluster of diamond crystals bonded together in self-bonded relationship or by means of some bonding medium disposed between the crystals or by some combination of the aforementioned bonding mechanisms. Such a compact is composed of diamond particles disposed in random fashion and as a result any cleavage of the compact will not occur along a single cleavage plane as would be the case with a single crystal but must follow a tortuous course dictated by the cleavage directions of the individual randomly oriented particles. Obviously a higher stress is required to cause this type of cleavage in a diamond compact. Forming of a diamond compact in a useful form in the initial bonding operation is preferable, since re-shaping or dressing the finished compact is costly in time and materials.

In the formation of diamond compacts from small diamond particles, that is diamonds having a particle size below about 10 mesh (U.S. Sieve No.), and in the preparation of conventional cutting tools employing larger diamonds one of the most severe problems has been the attainment of a good metal-to-diamond bond and retention thereof even after exposure to the heat of the brazing operation.

Fortunately, a method for obtaining a good metal-to-diamond bond is now available and is described and claimed in the patent application filed simultaneously herewith, S.N. 370,872—Vanderslice, which application is assigned to the assignee of the instant application. By the practice of this improved method for bonding metal to diamond a specific glow discharge technique is employed whereby at temperatures below the graphitization temperature of diamond, diamond crystals are first cleaned and when sufficient cleaning has been effected, a coating metal is deposited over the surfaces of the diamond crystals so cleaned during continued conduct of the cleaning operation. As a result a strong bond is produced between crystal and coating.

However, experiment has shown that the substantial benefits forthcoming from the deposition of an adherent metal coating to diamond particles by the method described in the aforementioned patent application by the use of glow discharge ion bombardment can be destroyed during brazing of the diamonds so coated wtih adherent metal films.

This problem arises because of the fact that the metal coated diamonds must be subjected to heat during the brazing operation involving the use of temperatures of at least about 1000° C. in most cases. Under these temperature conditions, the diamond surface disposed immediately beneath the coating metal tends to graphitize and, depending upon the period of time of exposure to temperatures in excess of about 800° C., the transformation of diamond to graphite may proceed to the extent that perceptible quantities of graphite will accumulate and the diamond-to-metal bond will be impaired or destroyed.

If, however, the diamond coating metal chosen is one having a high diffusion rate for carbon and possessing a high rate of carbide formation, the rate of graphite accumulation at the diamond-metal interface may be reduced according to the capacity of the coating metal to remove such graphite from the interface. The optimum arrangement would be one in which the graphite formed would be absorbed at a rate equal to the rate of formation thereof and transported away from the interface.

The criticality of this behavior may be more greatly appreciated when its is understood that in the manufacture of diamond compacts from small diamond particles first coated with metal and then brazed together with a brazing metal, the metal content is preferably to be kept to a minimum, or stated alternatively, the diamond content should be as large as possible. This fact necessitates the application of a relatively thin coating of metal to the diamond particle. The thickness of these metal coatings may range from 300 to about 6000 angstroms (A.) depending on the size of the diamond particle. Thus, a 10 mesh size particle can easily accommodate a coating of metal from about 3000 A. thick, while a 400 mesh size diamond should receive a metal coating about 300 A. or more thick. Thus only a relatively small amount of metal is available covering the surface of the diamond to act as a sink for any graphite that may be formed by transformation from the diamond state by heat applied during the brazing operation.

This factor of the thinness of the metal coating is to a large extent responsible for the careful consideration that must be given to the selection of braze materials. In addition to keeping both brazing temperature and the time of exposure to this higher temperature to their minimum values, it is important that although the braze must wet the metal coating the two materials (braze and coat) must not actively alloy with each other to any great extent or else alloying with the brazing metal will offer greater attraction to the coating metal than will the clean diamond-metal interface and the integrity of the diamond-metal coating bond will be destroyed. Described in a positive fashion, the tendency toward alloy formation between the braze metal and the metal coating should be slight. Actually, it has been found that copper, which has been reported (Hansen, "Constitution of Binary Alloys," 2nd ed., McGraw-Hill, 1958, page 600) as being completely immiscible with molybdenum, is a very effective braze for molybdenum coated diamond and numerous successful diamond compacts have been made employing this bonding medium.

Hansen (page 649) states that W and Cu are insoluble, From this, one would infer that Cu will not braze W. Contrary to the results reported in Hansen, tungsten films, such as may be deposited on diamond by glow discharge ion bombardment will braze to copper. In fact, the braze is so successful that the tungsten metal is separated from the diamond, adhering instead to the copper braze metal. For this reason it is considered still more unexpected that the copper brazing of molybdenum-coated diamonds is so successful.

To illustrate the problem, it has been found that a molybdenum coating applied to diamond particles by the glow discharge-method described in the afore-mentioned S.N. 370,872 in the form of a tenacious film will adhere to the diamond as long as the layer of molybdenum can still function as a sink for the graphite formed at the interface of diamond and metal. Examination of a previously well-bonded molybdenum film stripped from a diamond surface after being loosened by heating shows that the portion of the molybdenum film in actual contact with the diamond has been converted to Mo₂C and/or MoC. In the event of exposure to temperatures of at least about 1000° C. for greater than 15 seconds, there is evidence of the formation of Mo₂C. As the time of the exposure is increased more and more of the molybdenum becomes completely converted to MoC, the carbide form of molybdenum which is saturated with carbon and will no longer operate as an effective sink for the graphite which forms. At any point along the diamond-metal interface at which MoC has formed to any substantial degree, carbon resulting from the transformation of diamond material accumulates at the interface rendering ineffective the previous tenacious bond between metal and diamond. The higher the temperature to which the coated diamond is exposed, the more quickly the capacity of the molybdenum film to take up the non-diamond carbon is exhausted.

In addition to the effect of exposure to elevated temperatures as described above, the effect upon the diamond-molybdenum coating bond of particular braze materials is important. Thus, gold, which actively alloys with molybdenum can be successfully used to bond together molybdenum-coated diamonds, only if great care is taken to preserve the molybdenum-diamond bond. On the other hand nickel-gold and nickel-copper brazes alloy so rapidly with the molybdenum coating that the molybdenum coating inevitably loses its bond to the diamond and is pulled away therefrom as it alloys with the braze collecting as blobs of metal on the surface of the diamond, which globs are not adhered thereto.

With respect to titanium, it has been determined that this metal, like molybdenum, is well-suited for coating diamonds by the glow discharge method because titanium is a superior carbide former; has an extraordinarily high coefficient of friction with the surface of diamond; has a high sputtering rate, and provides tough, thick coatings. In addition, titanium is particularly adaptable to brazing with a silver-aluminum alloy eutectic containing 29.5 weight percent aluminum, the balance being silver, which alloy has a melting point of 5660° C. This value compares very favorably with the brazing temperature for titanium, which lies in the range of from about 600° to about 700° C. Opportunely, this alloy flows over and wets the titanium layer coating on a diamond particle but does not actively dissolve titanium thereby leaving the titanium layer undiminished in thickness and unimpaired in strength of bond to the diamond surface.

A second alloy of particular value as a brazing compound for titanium-coated diamonds has the composition 48 weight percent silver, 32 weight percent copper and 20 weight percent tin. After preparing titanium-coated diamonds, a compact may be produced by cleaning the coated diamonds in hydrogen at 400° C. Afterward the brazing operation is conducted in argon at about 775° C.

The compact-forming process including the brazing operation can be varied but an exemplary method is as follows for a copper-brazed diamond compact of molybdenum-coated diamonds. First, the diamond particles are coated with molybdenum by the glow discharge method of Ser. No. 370,872; next, the coating operation is repeated with copper. Thereafter, the doubly-coated diamonds are carefully closely packed into a form providing the desired final contour for the compact and under light pressure (about 5 kilobars or less—1 kilobar equals 987 atmospheres) in an inert atmosphere, the copper is sintered or melted. The completed compact having a ratio of diamond to metal of at least about 60:40 by volume may then be removed and mounted on a supporting shaft for use as a tool.

Another method for forming a diamond compact may be illustrated with titanium-coated diamonds. The diamonds coated with titanium as by the aforementioned glow discharge method are lightly packed into a mold formed in the shape of tool to be manufactured, the coated diamonds being interspersed with fine particles of the eutectic of silver and aluminum (29.5 weight percent Al; 70.5 weight percent Ag). In an inert atmosphere the temperature is raised to between about 600 and about 700° C. whereby brazing of the titanium is effected without destroying the titanium-diamond bond. The compacted diamonds (over 50 percent diamond by volume) may then be mounted on a tool shank by standard soldering or brazing methods.

Thus, by the practice of the invention described herein multiple small diamonds, either natural or man-produced, may be collected together and consolidated into sizeable compacts sufficiently large to replace natural diamonds in single point tools, drills, well bits, etc. This particular development is of great interest in connection with diamond manufacture as by methods disclosed in U.S. 2,947,608 and U.S. 2,947,609, which patents are assigned to the assignee of this invention, because it provides means for utilizing the large number of very small diamond particles incidental to such manufacture.

Obviously, many modifications and variations of the present invention are possible in the light of the above teachings. It is therefore to be understood that within the scope of the appended claims the invention may be practiced otherwise than as specifically described.

What we claim as new and desire to secure by Letters Patent of the United States is:

1. In an abrasive body consisting essentially of a plurality of diamond particles, a first metal covering the surface of each of said diamond particles and a second metal brazed to the coating of first metal over each diamond particle thereby fixing the relationship of said diamond particles in said body relative to each other, the improvement comprising the first metal being molybdenum and the second metal being copper.

2. The improvement substantially as recited in claim 1 wherein the volume of diamond material is at least 50 percent of the volume of the abrasive body.

References Cited

UNITED STATES PATENTS

| | | | |
|---|---|---|---|
| 2,382,666 | 8/1945 | Rohrig et al. | 51—309 |
| 2,210,039 | 8/1940 | Petrie | 51—309 |
| 2,367,404 | 1/1945 | Kott | 51—309 |
| 2,411,867 | 12/1946 | Brenner | 51—309 |
| 2,703,750 | 3/1955 | Cotter | 51—309 |
| 3,178,273 | 4/1965 | Libal | 51—309 |
| 3,239,321 | 3/1966 | Blainey et al. | 51—309 |

FOREIGN PATENTS

| | | |
|---|---|---|
| 560,410 | 4/1944 | Great Britain. |
| 837,013 | 6/1960 | Great Britain. |

ALEXANDER H. BRODMERKEL, *Primary Examiner.*

D. J. ARNOLD, *Assistant Examiner.*